US005229671A

United States Patent [19]

Neidhard et al.

[11] Patent Number: 5,229,671

[45] Date of Patent: Jul. 20, 1993

[54] ELECTROMAGNETIC ROTARY ACTUATOR

[75] Inventors: Klaus Neidhard, Weil der Stadt; Harald Kalippke, Benningen; Friedrich Wendel, Weissach; Erhard Renninger, Markgroeningen; Wolfgang Staudenmaier, Weinstadt; Johannes Meiwes, Markgroeningen; Albert Gerhard, Tamm; Dieter Dick, Muehlacker; Herbert Becker, Hemmingen, all of Fed. Rep. of Germany

[73] Assignee: Robert Bosch GmbH, Stuttgart, Fed. Rep. of Germany

[21] Appl. No.: 834,278

[22] PCT Filed: Aug. 4, 1990

[86] PCT No.: PCT/DE90/00601

§ 371 Date: Feb. 12, 1992

§ 102(e) Date: Feb. 12, 1992

[87] PCT Pub. No.: WO91/02894

PCT Pub. Date: Mar. 7, 1991

[30] Foreign Application Priority Data

Aug. 16, 1989 [DE] Fed. Rep. of Germany ....... 3926912

[51] Int. Cl.[5] ...................... H02K 33/00; H02K 15/02

[52] U.S. Cl. ........................................ 310/15; 310/43; 310/90

[58] Field of Search ................... 123/339; 251/129.11, 251/129.12; 310/15, 17, 28, 29, 90, 43

[56] References Cited

U.S. PATENT DOCUMENTS

| | | | |
|---|---|---|---|
| 3,229,170 | 1/1966 | Daugherty et al. | 317/197 |
| 4,474,149 | 10/1984 | Idogaki et al. | 123/308 |
| 4,496,134 | 1/1985 | Idogaki et al. | 251/65 |
| 4,922,604 | 5/1990 | Marshall et al. | 29/598 |
| 5,087,847 | 2/1992 | Giesbert et al. | 310/90 |

FOREIGN PATENT DOCUMENTS

| | | |
|---|---|---|
| 3001473 | 7/1981 | Fed. Rep. of Germany . |
| 3218210 | 11/1983 | Fed. Rep. of Germany . |

*Primary Examiner*—Steven L. Stephan
*Assistant Examiner*—Judson H. Jones
*Attorney, Agent, or Firm*—Michael J. Striker

[57] ABSTRACT

In a rotary actuator (1) with rotary slide valve (3) for controlling a throttle cross-section, the sealing of the pneumatic (16) and of the electrical part (17) is to be improved. For this purpose, the shaft (11) is supported twofold, both on this side and on the other side of the rotary slide valve (3). Both roller bearings (13, 14) are located in a one-piece housing (12). As a result, the tolerance-related width of the air gap between rotary slide valve (3) and control opening (6) is reduced, on the one hand, and, on the other hand, an isolating seal between the parts (16) and (17) is formed by the bearing (13). The rotary actuator (1) is particularly suitable as idle-speed rotary actuator for internal combustion engines.

11 Claims, 1 Drawing Sheet

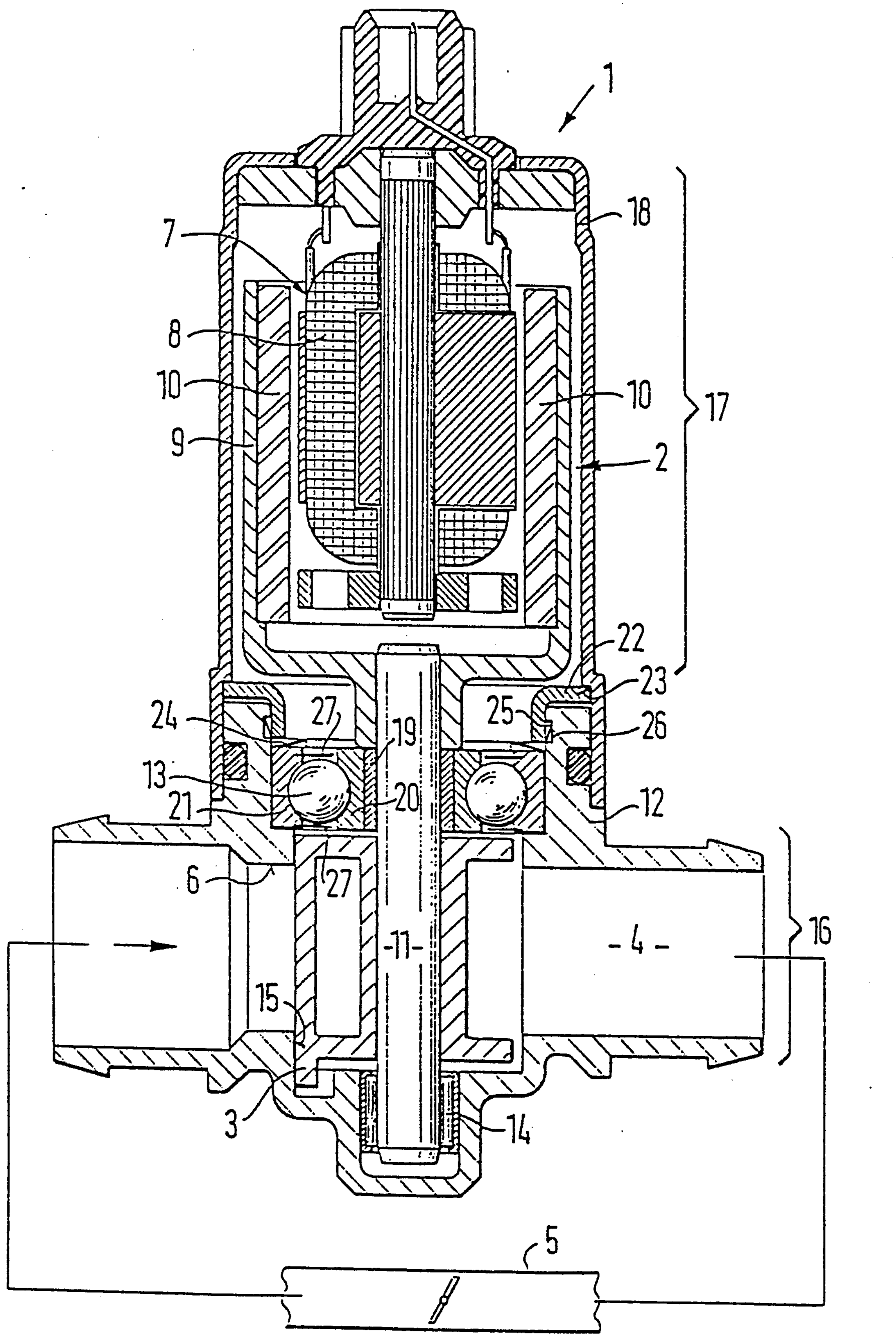
1
18
7
8
10
10
17
9
2
22
23
24
27
19
25
26
13
20
21
12
6
27
16
-11-
- 4 -
15
3
14
5

ELECTROMAGNETIC ROTARY ACTUATOR

BACKGROUND OF THE INVENTION

The invention relates to a rotary actuator, particularly for controlling a throttle cross-section in a line carrying operating fluid for an internal combustion engine.

An electromagnetic rotary actuator is known comprising an actuating motor with a stator which is fixed with respect to a housing cap in which the motor is located and with a rotatable rotor which is mounted on a rotor shaft nonrotatably attached to a throttle member which more or less opens a control opening.

Such rotary actuator is already known from German Offenlegungsschrift 37 28 589 but the rotary slide valve of this actuator is supported to be rotatable about a shaft carried in two housing parts. The sealing between the pneumatic part and the electrical part is there effected by the throttle member covering the control opening in the pneumatic housing, which, however, may not "come into grazing contact" in spite of the tolerances required. If dirt particles, shavings or water droplets carried by inadequately cleaned combustion air pass through the sealing gap into the electrical part of the rotary actuator, functional disturbances or corrosion can occur. In addition, air can be sucked away from the electrical part in an unwanted manner and erroneously change the desired fuel/air ratio.

SUMMARY OF THE INVENTION

It is an object of the present invention to provide an electromagnetic rotary actuator, particularly for throttling an operating fluid flow in an internal combustion engine, which does not have the above-mentioned disadvantages.

This object and others which will be made more apparent hereinafter are attained in an electromagnetic rotary actuator comprising an actuating motor with a stator which is fixed with respect to the housing and a rotatable rotor which is attached to a rotor shaft of a throttle member which more or less opens a control opening when rotated by the actuating motor.

According to the invention, the electromagnetic rotary actuator comprises an electrical part including a housing cap and an actuating motor comprising a stator held fixed relative to the housing cap and a rotatable rotor positioned so as to be rotatable relative to the stator, the stator and the rotor being held in the housing cap;

a pneumatic part including a one-piece housing containing a portion of a line for a fluid provided with a control opening and a throttle member rotatable so as to more or less open or close the control opening in the line, wherein the one-piece housing also has two bearings, the bearings being located on opposite sides of the throttle member and rotatably supporting a rotor shaft nonrotatably attached to the throttle member and the rotatable rotor so that, when the actuating motor is energized to rotate the rotor, the throttle member is rotated to more or less open or close the throttle opening.

By comparison, the actuating motor according to the invention has the advantage that the sealing of the electrical and of the pneumatic part is improved and the quantity of leakage air is reduced. This is achieved by the improved way of supporting the shaft of the rotary slide valve, on the one hand due to its tolerance-reducing support in a single housing part which leads to a noticeable reduction in the working air gap between throttle member and control opening. On the other hand, the roller bearing between the pneumatic and the electrical part acts as a seal for protecting the motor.

The isolation between the electrical and the pneumatic part of the rotary actuator by the throttle can be particularly advantageous. The gap remaining in the roller bearing is largely closed by cover discs and grease so that duct and fluid droplets are effectively kept back. Arranging the throttle member at an intake end of the line leads to dirt particles predominantly becoming deposited on the rear of the throttle member facing away from the sealing area. Production and assembly of the rotary actuator is simplified by the simple construction of the rotor shaft and the way the sealing roller bearing is mounted. An angle disc which rests against a shoulder of the housing cap can be provided to advantageously hold the bearing between the throttle member and the actuating motor in place in the one-piece housing. The angle disc can have noses which engage in an undercut groove provided in the one-piece housing. The noses prevent the angle disc from becoming attracted and moved out of place by the permanent magnets of the rotor during assembly.

BRIEF DESCRIPTION OF THE DRAWING

The objects, features and advantages of the present invention will now be illustrated in more detail by the following detailed description, reference being made to the accompanying drawing in which:

The sole FIGURE is an axial cross-sectional view of an electromagnetic rotary actuator according to the present invention.

DETAILED DESCRIPTION OF A PREFERRED EMBODIMENT

The rotary actuator 1 has an actuating motor 2, the rotor 9 of which acts on a throttle member 3 which is arranged in a bypass line 4 in a housing 12. The bypass line 4 is connected at both ends to an intake pipe 5 with throttle flap 4 controlling the idling combustion air of an internal combustion engine. The throttle member 3 is seated in an opening 15 of the housing 12, which intersects the bypass line 4, and is constructed as rotary slide valve which more or less closes a control opening 6 at the intake end of the bypass line 4. The arrow specifies the direction of flow in the line 4. The actuating motor 2 consists of a central stator 7 with field windings 8 and the cup-shaped rotor 9 which exhibits two permanent magnet segments 10 arranged on its cylinder-jacket-shaped wall. These permanent magnet segments are shell-shaped and cover an angular range of about 135° each. The rotor 9 has a smooth stepless shaft 11 which is supported with low friction in two bearings 13, 14 held in the housing 12 and arranged on this side and on the other side of the throttle member 3 and from which the cylinder-jacket-shaped wall of the rotor 9 extends. The throttle member 3 protruding into the opening 15 of the housing 12 and controlling the bypass line 4 is mounted on the shaft 11. The bypass line 4 and the throttle member 3 together form the pneumatic part 16 whereas stator 7 and rotor 9 form the electrical part 17 of the rotary actuator 1. The electrical part 17 is covered by a housing cap 18 in which the stator 7 is mounted on one side.

The bearing 13 constructed as roller bearing is pressed with its inner ring 20, if necessary with interposition of a ring 19, onto the rotor shaft 11 between the pneumatic part 16 and the electrical part 17. The outer ring 21 of the bearing 13 is inserted into the housing 12 and is held by an angle disc 22. The angle disc is pressed against the bearing 13 by a shoulder 23 in the housing cap 18. For pressing the bearing 13 against the housing 12 and for compensating for tolerances, a spring disc 24 is inserted between bearing 13 and angle disc 22. The angle disc 22 exhibits noses 25 pointing towards the housing 12 so that, during the assembly of the stator 7, the stator 9 is not pulled out of the housing 12 again due to the force of attraction of its permanent magnets 10. These noses engage an undercut groove 26 in the housing 12. The housing cap 18 is screwed to the housing 12 in a manner not shown.

The roller bearing 13 is filled with grease, also in order to increase the sealing effect. To keep the grease in the bearing and to keep away dirt and water, cover discs 27 are attached to the fixed outer ring 21 of the bearing 13. The bearing 13 and bearing 14 are arranged on both sides of the opening 15 in the housing 12.

The rotary actuator 1 is assembled by the rotor shaft 11 with rotary slide valve 3, bearings 13, 14 and rotor 9 in place and angle disc 22 being inserted from the top into the housing 12. After that, the angle disc 22 is pressed against the housing 12 so that the noses 25 lock in. Finally, the housing cap 18 with stator 7 installed is slipped over the rotor 9, pressed against the housing 12 and screwed down. During this process, the angle disc 22 presses against the bearing 13 and fixes the latter in place.

The arrangement of the two bearings 13, 14 in the housing 12 allows for very accurate machining of the holding openings for the bearings and the opening 15 for the rotary slide valve 3 in one clamping arrangement so that the rotary slide valve rotation is very accurately balanced and the diameter tolerances of rotary slide valve and opening can be reduced which results in only very small leakage gaps.

We claim:

1. Electromagnetic rotary actuator comprising an electrical part including a housing cap and an actuating motor comprising a stator held fixed relative to the housing cap and a rotatable rotor positioned to be rotatable relative to the stator, said stator and said rotor being held in said housing cap;

a pneumatic part including a one-piece housing containing a portion of a line for a fluid provided with a control opening and a throttle member rotatable to more or less open or close the control opening in the line, two bearings both arranged in the one-piece housing so that any accurate machining of openings for the two bearings and the throttle member can be performed in one clamping arrangement, said bearings being located at opposite sides of said throttle member and control opening; and a rotor shaft rotatably supported in said bearings, said rotor shaft being nonrotatably attached to the throttle member and the rotatable rotor so that, when the actuating motor is energized to rotate said rotor, said throttle member is rotated to more or less open to close the throttle opening and one of said bearings having a transverse cross section which is greater that the transverse cross section of said throttle member while the other of said bearings has a transverse cross section which is smaller than the transverse cross section of said throttle member.

2. Rotary actuator as defined in claim 1, wherein the one-piece housing for the throttle member and one of the bearings located between the throttle member and the actuating motor isolate the pneumatic part including the line with the control opening and the throttle member from the electrical part including the stator and the rotor.

3. Rotary actuator as defined in claim 2, wherein the bearing between the throttle member and the actuating member is a grease-filled roller bearing having an interior space sealed with cover disks on opposite sides thereof.

4. Rotary actuator as defined in claim 1, wherein the rotor shaft is a smooth stepless shaft.

5. Rotary actuator as defined in claim 2, further comprising spring means for pressing the bearing between the throttle member and the actuating motor in the one-piece housing under spring force.

6. Rotary actuator as defined in claim 2, further comprising an angle disc holding the bearing between the throttle member and the actuating motor in place in the one-piece housing, said angle disc resting against a shoulder of the housing cap.

7. Rotary actuator as defined in claim 3, wherein the angle disc has noses which engage in an undercut groove provided in the one-piece housing.

8. Rotary actuator as defined in claim 1, wherein the line is a bypass line for operating fluid of an internal combustion engine and the throttle member is arranged in the vicinity of an intake end of the bypass line.

9. Electromagnetic rotary actuator comprising an electrical part including a housing cap and an actuating motor comprising a stator held fixed relative to the housing cap and a rotatable rotor positioned to be rotatable relative to the stator, said stator and said rotor being held in said housing cap;

a pneumatic part including a one-piece housing containing a portion of a line for a fluid provided with a control opening and a throttle member rotatable to more or less open or close the control opening in the line, two bearings in the one-piece housing, said bearings being located at opposite sides of said throttle member and control opening; and a rotor shaft rotatably supported in said bearings, said rotor shaft being nonrotatably attached to the throttle member and the rotatable rotor so that, when the actuating motor is energized to rotate said rotor, said throttle member is rotated to more or less open or close the throttle opening, the one-piece housing for the throttle member and one of the bearings located between the throttle member and the actuating motor isolating the pneumatic part including the line with the control opening and the throttle member from the electrical part including the stator and the rotor, the bearing between the throttle member and the actuating member being a grease-filled roller bearing having an interior space sealed with cover disks on opposite sides thereof.

10. Electromagnetic rotary actuator comprising an electrical part including a housing cap and an actuating motor comprising a stator held fixed relative to the housing cap and a rotatable rotor positioned to be rotatable relative to the stator, said stator and said rotor being held in said housing cap;

a pneumatic part including a one-piece housing containing a portion of a line for a fluid provided with a control opening and a throttle member rotatable to more or less open to close the control opening in the line, two bearings in the one-piece housing, said bearings being located at opposite sides of said throttle member and control opening;

a rotor shaft rotatably supported in said bearings, said rotor shaft being nonrotatably attached to the throttle member and the rotatable rotor so that, when the actuating motor is energized to rotate said rotor, said throttle member is rotated to more or less open to close the throttle opening, the one-piece housing for the throttle member and one of the bearings located between the throttle member and the actuating motor isolating the pneumatic part including the line with the control opening and the throttle member from the electrical part including the stator and the rotor; and spring means for pressing the bearing between the throttle member and the actuating motor in the one-piece housing under spring force.

11. Electromagnetic rotary actuator comprising an electrical part including a housing cap and an actuating motor comprising a stator held fixed relative to the housing cap and a rotatable rotor positioned to be rotatable relative to the stator, said stator and said rotor being held in said housing cap;

a pneumatic part including a one-piece housing containing a portion of a line for a fluid provided with a control opening and a throttle member rotatable to more or less open to close the control opening in the line, two bearings in the one-piece housing, said bearings being located at opposite sides of said throttle member and control opening;

a rotor shaft rotatably supported in said bearings, said rotor shaft being nonrotatably attached to the throttle member and the rotatable rotor so that, when the actuating motor is energized to rotate said rotor, said throttle member is rotated to more or less open to close the throttle opening, the one-piece housing for the throttle member and one of the bearings located between the throttle member and the actuating motor isolating the pneumatic part including the line with the control opening and the throttle member from the electrical part including the stator and the rotor; and an angle disc holding the bearing between the throttle member and the actuating motor in place in the one-piece housing, said angle disc resting against a shoulder of the housing cap.

* * * * *